T. W. Rammell,
Centrifugal Pump,
N°. 42,716. Patented May 10, 1864.
Fig. 1. Fig. 2.
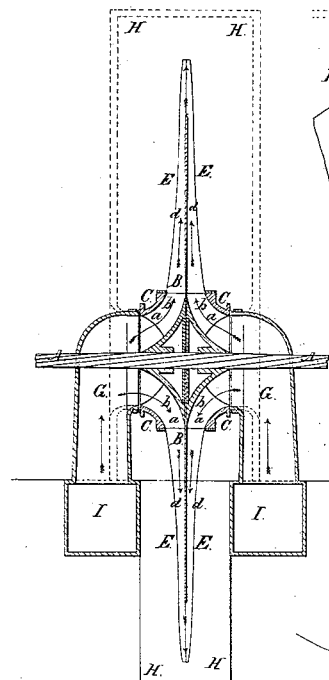
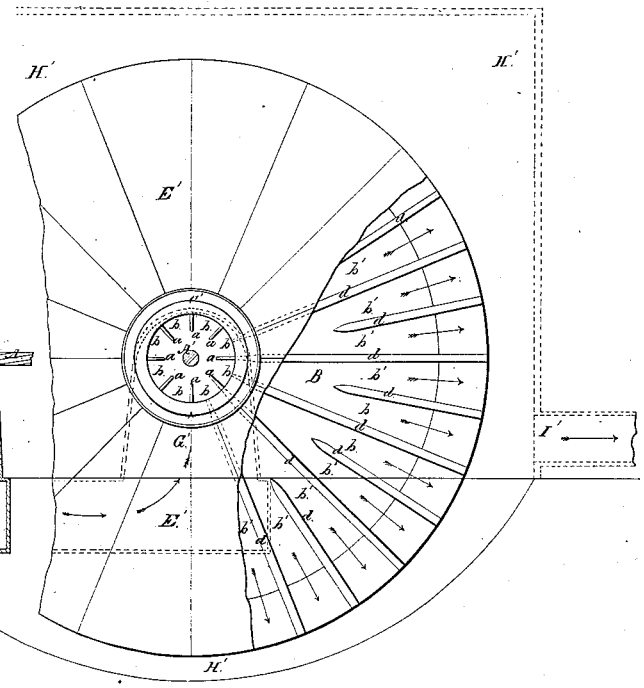
Fig. 3. Fig. 4. Fig. 5.
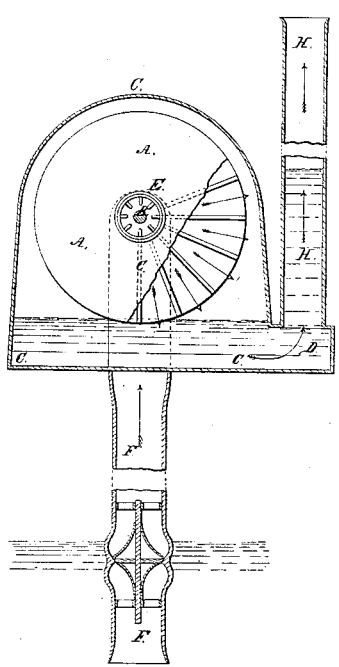
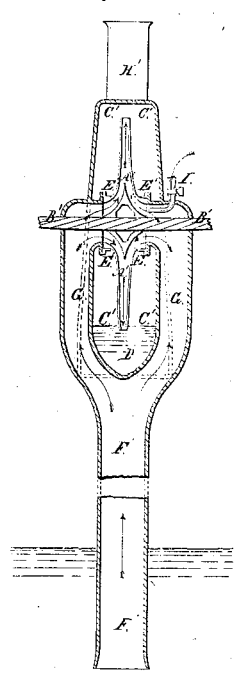
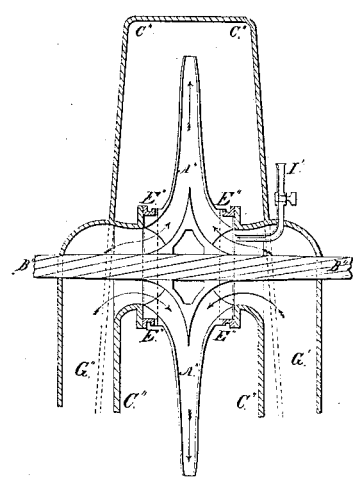

UNITED STATES PATENT OFFICE.

THOMAS WEBSTER RAMMELL, OF LONDON, ENGLAND.

IMPROVEMENT IN CENTRIFUGAL DISKS REVOLVING IN AIR AND WATER.

Specification forming part of Letters Patent No. 42,786, dated May 10, 1864.

*To all whom it may concern:*

Be it known that I, THOMAS WEBSTER RAMMELL, of London, in the county of Middlesex, civil engineer, a subject of the Queen of Great Britain, have invented or discovered new and useful improvements in centrifugal disks revolving in air, water, and other fluids, and in the application of motive power by such disks; and I, the said THOMAS WEBSTER RAMMELL, do hereby declare the nature of the said invention and in what manner the same is to be performed to be particularly described and ascertained in and by the following statement thereof—that is to say:

In the ordinary rotating fan or blower, as used for producing a blast or current of air from the machine, the effect produced is due partly to momentum communicated by vanes or blades to air drawn into the machine at the center and driven out at the circumference, or what is termed "centrifugal force," and partly to the beating of the vanes or blades against the air at the circumference, which latter action is accompanied with disagreeable noise and much loss of power.

My invention consists in an improvement in the construction of a rotating wheel or disk, (which I call a centrifugal disk,) so that the effect produced shall be due solely to centrifugal force, and by the construction adopted the noise and loss of power are avoided and the disk acts in a more steady and equable manner and with greater effect. This improved centrifugal disk may be applied with some variation of construction, as hereinafter explained, either to the producing a draft or current of air toward the machine or to the producing a blast or current of air from the machine, or simultaneously to both these purposes, or to the raising, drawing, forcing, or throwing of water or other liquids.

My centrifugal disk consists of a flat, hollow, circular wheel or case made to revolve upon an axis passing through its center. The disk is thicker or broader at the center and diminishes gradually in thickness or breadth toward the circumference, so that its section is wedge-shaped. The disk is divided into passages or compartments by internal partitions fixed to and forming part of it, and moving round with it, which extend from the circumference to or toward the center, and is left open or uncovered at the rim or edge. The disk and the internal passages of ducts formed by the divisions are to be constructed of such a shape that their sectional areas may be the same or nearly the same at all distances from the center, and that the sum of the transverse areas of all the passages or ducts may be the same or nearly the same as that of the apertures at the center, through which the air is admitted, and I prefer also slightly to contract the width of the openings of the passages at the rim or outer edge of the disk.

In Sheet 1 of the accompanying drawings, Figure 1 is a cross-section, taken through the center of the centrifugal disk in the direction of the axis; and Fig. 2 is a sectional elevation at right angles to the axis, showing the internal construction of the disk.

In these figures, A A' represent the axis or shaft upon which the disk is fitted, and which is connected with the steam-engine or other motive power employed in any convenient manner.

B B' is a flat circular disk or plate fixed centrically to the shaft A A', and of less diameter than the complete disk.

C C' are hollow pieces, constituting the central portion of the disk, each divided by the ribs *a a a* into a number of radiating passages or ducts, *b b b*. These pieces are also fixed upon the shaft and serve both to hold the middle plate, B B', in position and as mouth-pieces for admitting the air on either side.

*d d d* are radiating ribs, in any convenien number, extending from the circumference of the disk to or toward the central pieces on either side, and forming the passages or ducts *b' b' b'*. They are bolted together in pairs and to the middle plate as far as it extends.

E E' are thin metal plates screwed to the radiating ribs and forming the outer sides of the disk.

When the machine is to be applied to the producing and maintaining a draft or current of air toward or into the machine, the central openings on either side are connected by means of hollow trunks G G', and the necessary intervening pipage, or by other convenient means, with the chamber or place from which the air is to be drawn or exhausted, and the disk is made to revolve with more or less velocity when the air flows or is drawn into the machine, and through the ducts or passage b b b b' b' b', and is driven out all round the circumference of the disk at the open rim or edge. The disk as thus constructed may be applied for all purposes where a draft or current of air toward the machine is to be produced and kept up, such as the ventilation of mines, buildings, and ships, and the blasts of furnaces and forges by drawing the current of air through the fire, and the like, and may also be applied to the more or less perfect exhaustion or rarefaction of the air in a chamber or receptacle of any shape or size, or in a tunnel or tube.

Where the machine is to be applied to the producing a blast or current of air from the machine, it is necessary that the air should flow or be expelled from the circular disk, not freely into the surrounding air, but into a closed chamber or receptacle, which I call a "pressure-chamber," and so out of the pressure-chamber by one or more apertures, and this pressure-chamber I prefer to construct of large capacity.

In Sheet 1, Figs. 1 and 2 show the centrifugal disk within the pressure-chamber H H', which may be of any convenient shape, and which has a pipe or pipes, I I', leading out of it, and conducting the blast or current of air to the desired point or points.

When the machine is to be applied only to the producing a blast, the trunks G G', (shown in Figs. 1 and 2,) with the intervening pipage and valves, are not required, but where the machine is to be used for the double purpose of producing and maintaining both a draft and a blast, they must be used in combination with the pressure chamber and pipe or pipes I I', above described.

For all the above purposes I prefer to make the disk of diameter so large as to admit of the effect desired being attained by direct action from the engine employed—that is to say, by simple crank movement, as in the case of a driving-wheel of a locomotive-engine, or with as little intermediate gearing as possible.

When the machine is to be applied to the raising, drawing, forcing, or throwing of water, the same general construction is to be adopted, but in this case it is requisite to use a disk of much smaller diameter than in the former cases, although in this case also I prefer so to proportion the disk that it may be worked by direct action. In this case I always use a pressure-chamber; and as it is desirable that the disk should revolve or rotate wholly, or as nearly so as may be, in air, I admit or force air into the pressure-chamber in such quantity as will effect this object, which is attended with this further advantage, that the compressed air within the pressure-chamber causes the water or other liquid to issue or be ejected from the machine more steadily and equably than would otherwise be the case.

In Sheet 1, Fig. 3 is a longitudinal section, Fig. 4 is a transverse section, and Fig. 5 is an enlarged transverse section, of the centrifugal disk, as applied to the raising, drawing, forcing, or throwing of water.

A A' A" is the disk, which, in this case, it would be preferable to construct entirely of metal, rotating in a vertical plane upon the horizontal shaft B B' B". C C' C" is the external case or pressure-chamber, which may be of any form, but which I prefer to make of the form shown, and more capacious in the lower than in the upper part, and with the prolonged part D D' at one end. E E' E" are air-tight collars, fitted round the mouth of the disk on either side, and working upon plane surfaces inside the case, against which they are pressed. F F' is the suction-pipe from a well, communicating through the branches G G' with the mouth of the disk. H H' is the discharge-pipe, of any required height; and I I' is an inlet-pipe for air, through which the air may be admitted or forced into the pressure-chamber in any convenient manner, and from time to time as occasion may require.

Having now described my invention, I wish it to be understood that I do not claim as my invention the using or applying a centrifugal wheel or disk, of whatever construction or description, either to the producing a draft of air or a blast, or to the raising, drawing, forcing, or throwing of water, as these have been done previously; but

What I claim as my invention, and desire to secure by Letters Patent, is—

1. The arrangement, in centrifugal disks, as above described, of the separate radial passages or ducts b b b, formed by the straight ribs a a a, attached to the central shaft, A A', and extending to the circumference, the said ducts having their respective sectional areas uniform or nearly uniform throughout, and equal or nearly equal to the areas of the corresponding openings which admit the air or fluid at the center.

2. In combination with the foregoing, the arrangement of the secondary ribs d d d, extending from the circumference toward the center, and forming the secondary ducts b' b' b', as above described, by means of which the centrifugal force of the revolving disk is greatly increased for the expulsion of the air or other fluid at the circumference.

3. The improved disk, as above described, with or without a pressure-chamber, in combination with the air-tight collars E E' E", fitted around the mouth of the disk, and communicating by suitable tubes or pipes with any reservoir of air, water, or other fluid, all arranged in the manner and for the purposes above described.

T. W. RAMMELL.

Witnesses:
R. DUDLEY BAXTER,
DAVID BLELLOCH,
*Both of 6 Victoria street, Westminster.*